March 31, 1931.  A. P. DAVIS  1,798,592
ELECTRIC CONTROL SYSTEM
Filed April 2, 1926
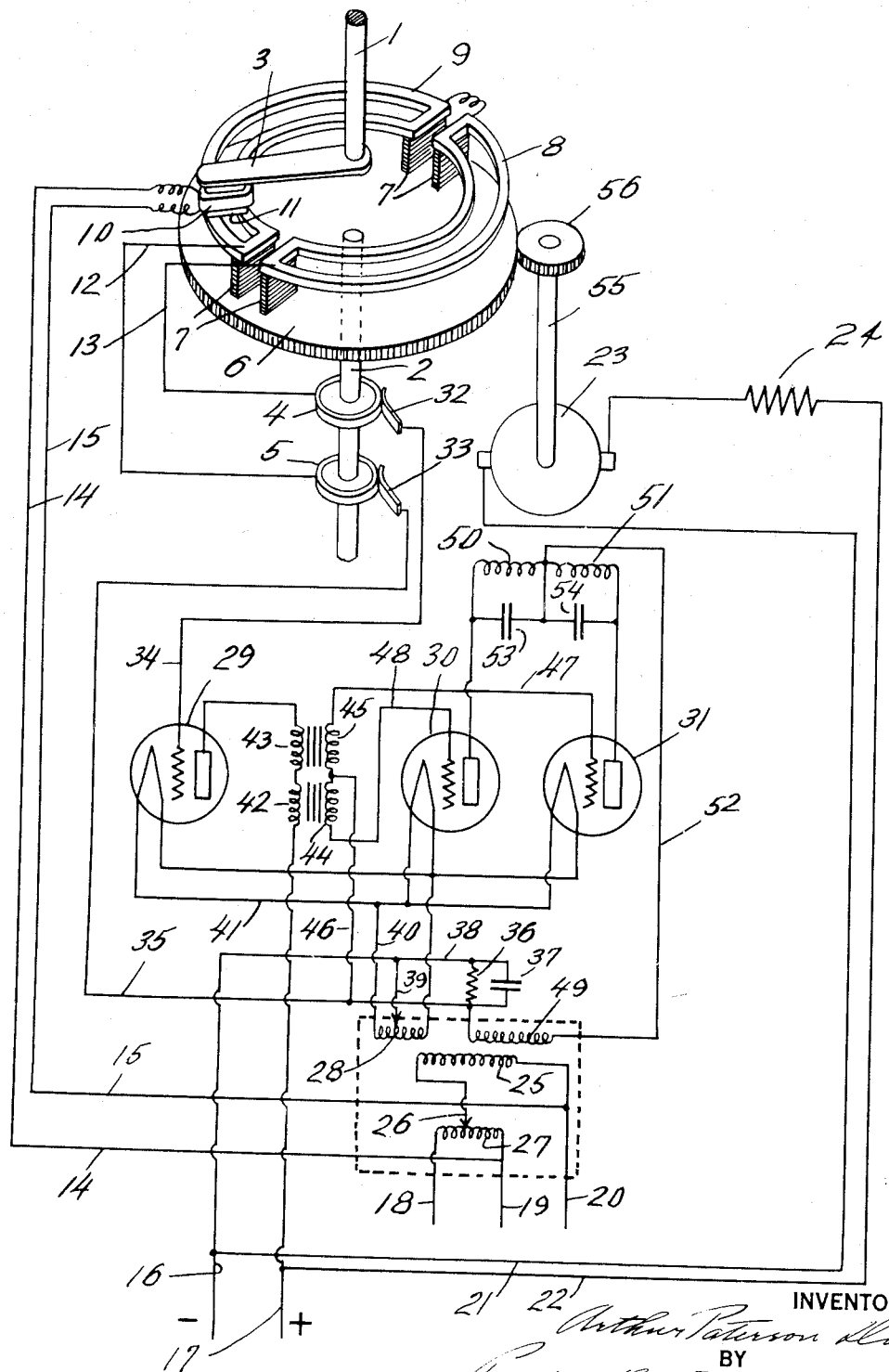
INVENTOR
Arthur Paterson Davis
BY
ATTORNEYS Patented Mar. 31, 1931

1,798,592

UNITED STATES PATENT OFFICE

ARTHUR PATERSON DAVIS, OF NEW YORK, N. Y.

ELECTRIC CONTROL SYSTEM

Application filed April 2, 1926. Serial No. 99,277.

This invention relates to electric control systems. It is particularly applicable to follow-up systems such as those employed in conjunction with gyroscopic compasses. One of the principal objects of the invention is to provide an improved electric control system including a primary actuating member and a secondary member influenced or controlled by the primary member, the system being such that the secondary member does not react in any way upon the primary member.

In electrical control systems such as those commonly used in conjunction with follow-up systems, it is customary to employ a motor for driving the follow-up element and to have this motor responsive to changes taking place in the primary part of the system. In practice it has been found to be rather difficult to supply the required amount of energy to the motor without impairing the normal functions of the primary part of the system. One of the main objects of this invention is to provide a system whereby any desired amount of power can be supplied to a motor without in any way interfering with the primary part of the system. A further object is to provide a system wherein the ordinary fluctuations of the supply voltage and frequency do not in any way interfere with the successful operation of the system.

In general, the various objects of my invention can be attained by utilizing a plurality of three-electrode vacuum tubes. The well known three-electrode vacuum tube functions as a voltage operated relay and if proper conditions are maintained it is not necessary to supply any energy to the input side of the tube. The output current, on the other hand, contains a component modulated in accordance with the variations of grid voltage and this output current of course represents an actual expenditure of energy. My improved system includes a plurality of electrical conductors arranged in inductive relation to each other. The system is such that any ordinary change in the inductive relation between these conductors produces a change in the voltage impressed upon the grid of a three-element vacuum tube. The output current of the vacuum tube is affected by this change in the impressed input voltage and I take advantage of this modified output current to control the operation of a receiving device such as an electric motor. This output current can be amplified and supplied to other vacuum tubes which may act as rectifiers in a circuit including one or more elements of the receiving device. For example, the output current from the first vacuum tube may be supplied to the primary winding of a transformer, the secondary of the transformer may be connected to the grids of two three-element vacuum tubes and the plate circuits of these two vacuum tubes may be connected to windings on a motor. This motor may be used for the purpose of re-establishing stable conditions in the arrangement of electrical conductors mentioned above.

This improved system is of considerable practical value because it makes it possible to supply a rectified alternating current to one or more windings of a motor to put the motor in operating condition. Where this is done, and especially where this rectified current is subjected to the well known action of one or more condensers which render the current substantially continuous, it is possible to supply more useful energy to the motor,—there is no wattless component as there is where alternating current is supplied to the motor. Accordingly my improved system makes it possible to get more power out of a motor of given size than has heretofore been considered possible in systems of this type.

In the single figure of the accompanying drawings, I have illustrated in diagrammatic form one application of my invention. In this figure I have illustrated the application of my invention to a follow-up system. I have shown a primary element 1 which at times may be caused to move with respect to a secondary element 2 which may be considered as a follow-up element. I have illustrated the primary element as a shaft carrying an arm 3. It will be understood that the shaft may be connected to any device the motion of which is to be followed or repeated by some other element such as that indicated at 2. The element 2 is represented as comprising a shaft carrying slip rings 4 and 5 and also carrying a large gear 6. This gear carries a plurality of supports 7 on which are mounted coils 8 and 9. If the gear 6 is made out of conducting material it is desirable to have the support 7 made out of insulating material and to have these supports of sufficient dimensions so that the coils 8 and 9 are mounted at a considerable distance from the gear 6. This arrangement is desirable in order to avoid the loss of energy which would be involved if the coils were mounted in very close proximity to a conducting member such as a metal gear. The coils 8 and 9 are represented as being of substantially semi-circular outline, but it will be understood that coils of other outline may be employed. The arm 3 fastened to the shaft of the primary element carries a coil 10 having a magnetic core 11. The coils 8 and 9 are spaced apart a short distance and these coils are connected in series in such a manner that the voltage induced in one coil opposes that induced in the other coil. Accordingly, when the arm 3 occupies a position such that the coil 10 is symmetrically disposed between the coils 8 and 9, there is no voltage impressed across the leads 12 and 13, even though alternating current is being supplied to the coil 10 through leads 14 and 15. The voltage induced in coil 8 is exactly equal and opposite to that induced in coil 9.

In the system shown in the single figure of the drawings, I provide a source of direct current represented by the leads 16 and 17 and a source of alternating current represented by the leads 18, 19 and 20. The leads 14 and 15, which are connected to the coil 10 on the arm 3, are connected across leads 19 and 20 in order that they may supply alternating current to the coil 10. A pair of leads 21 and 22 supply current from the direct current source to the armature 23 of a motor. A current limiting resistance 24 is connected in the armature circuit, in accordance with usual practice.

The primary winding 25 of a transformer is connected to the alternating current supply lead 20 and to an adjustable contact 26 on a coil 27 which is connected across leads 18 and 19. A secondary winding 28 serves to supply current to the filaments of a plurality of vacuum tubes 29, 30 and 31.

The leads 12 and 13 which form the terminals of the two coils 8 and 9, mounted on the secondary or follow-up member 2, are connected to the slip rings 4 and 5. The brushes 32 and 33 which cooperate with the slip rings 4 and 5 respectively, are connected to the input side of the vacuum tube 29. The brush 32 is connected directly to the grid of this vacuum tube by means of a lead 34. The brush 33 is connected to the filament of this vacuum tube through lead 35, resistance 36 and condenser 37, lead 38, lead 39, transformer coil 28, lead 40, and filament lead 41. The plate voltage for the vacuum tube 29 is supplied by the source of direct current represented by the leads 16 and 17. The lead 17 is connected to the plate through primary windings 42 and 43 of two transformers which may be of the ordinary audio frequency type. The D. C. supply lead 16 is connected to the filament of the tube 29 through lead 39, transformer winding 28, and leads 40 and 41.

From the above description, it will be apparent that whenever the arm 3 of the primary element 1 is moved away from its stable or neutral position midway between coils 8 and 9, a voltage is impressed across leads 12 and 13. In the drawing I have shown the arm 3 displaced so as to produce such a voltage across leads 12 and 13. It will be understood that when the arm occupies such a position as that shown, there is a certain voltage induced in coil 9 and there is practically no voltage induced in coil 8. As a result, there is a voltage across leads 12 and 13 practically equal to the voltage induced in coil 9. This voltage is picked up by the brushes 32 and 33 and the slip rings 4 and 5 and impressed across the filament and grid of the vacuum tube 29. This alternating voltage produces variations in the plate current of the vacuum tube 29 and the resulting pulsating current flows through the primary windings 42 and 43 of the two transformers above mentioned. This action takes place without in any way affecting the operation of the primary element; that is, there is no reaction whatever produced on the arm 3 or the coil 10 carried by this arm due to the fact that the arm 3 is displaced from its normal position and a voltage has been impressed across the leads 12 and 13. Ordinarily, if proper conditions are maintained, no current whatever flows through leads 12 and 13. The lead 39 is connected to the mid-point of the transformer winding 28 and the resistance 36 serves to maintain the grid of tube 29 at a negative potential with respect to the filament.

In order that the output current of the vacuum tube 29 may be used to the best advantage, I prefer to employ the transformers having primary windings designated by the reference numerals 42 and 43 and having secondary windings shown at 44 and 45. I have shown two transformers having the primary windings connected in series and the secondary windings connected in the same manner. A lead 46 is connected to the junction point between the secondary windings. It will of course be understood that I might employ a single transformer having a tap which would be the equivalent of the connection just described. In the particular embodiment illustrated, the secondary winding 45 is connected by means of a lead 47 to the grid of vacuum tube 31 and the other secondary winding 44 is connected to the grid of vacuum tube 30 by means of a lead 48. The lead 46 which is connected to the junction point between the two secondary windings is connected to the lead 35. The grid circuit for each of the tubes 30 and 31 is completed through lead 35, the resistance 36 and condenser 37, lead 38, lead 39, transformer winding 20 and lead 40. The plate voltage for each of the vacuum tubes 30 and 31 is supplied by a high voltage secondary transformer winding 49 inductively related to the primary winding 25, above described.

As pointed out above, the motor armature winding 23 is supplied with direct current through leads 21 and 22. The field structure for this motor is provided with windings represented diagrammatically at 50 and 51. These windings are arranged in such a manner that when the current flowing through both of them is of the same value, the motor does not develop any torque. Current is supplied to the field windings 50 and 51 by the high voltage transformer winding 49. One terminal of this transformer winding is connected by means of a lead 52 to a junction point between the windings 50 and 51. It will be understood that these two windings are connected in series with each other. Reference to the drawing shows that the winding 50 is connected with the plate of vacuum tube 30 and the winding 51 with the plate of vacuum tube 31. The filaments of these two vacuum tubes are connected to the high voltage transformer winding 49 in the manner above described and this completes the plate circuits for both vacuum tubes 30 and 31. It will be noted that these two vacuum tubes and the two field windings 50 and 51 are connected in parallel relation with each other, current being supplied to this system of connections by the transformer winding 49. Condensers 53 and 54 are connected across the field windings 50 and 51 for the purpose of converting the rectified current delivered by the vacuum tubes 30 and 31 into a substantially constant unidirectional current.

As explained above, any displacement of the arm 3 of the primary element with respect to the coils 8 and 9 produces a voltage in the grid circuit of the vacuum tube 29. This alternating voltage causes the plate current of this tube to pulsate and this in turn induces a current in the secondary transformer windings 44 and 45. These secondary windings are connected to the grids of vacuum tubes 30 and 31 in such a manner that when one of these grids is positive, the other grid is negative. The plates of the two rectifier tubes 30 and 31 are, as described above, connected through the opposing field windings 50 and 51 to the high voltage transformer winding 49. If at the instant when the plates of the rectifier tubes are positive with respect to the filament, one tube has a negative voltage impressed on its grid while the other tube has a positive voltage impressed on its grid, the respective plate currents will then be unequal and a magnetic flux will be set up in the motor field and the motor will operate. It is thus apparent that the motor operates only when voltage is being supplied to the grids of the rectifier tubes and this occurs only when the arm 3 of the primary member is displaced from its stable position with respect to the coils 8 and 9 carried by the secondary member. When the rectifier tube plates are negative with respect to the filament, no current flows in either plate circuit. The motor can be used as a means for restoring the stable condition of the inductively related elements 8, 9 and 10. Accordingly, I have shown the motor shaft 55 connected to a pinion 56 meshing with the gear 6 of the secondary or follow-up element. As soon as the gear 6 has been moved so that the coil 10 is again symmetrically disposed with respect to the coils 8 and 9, no voltage is impressed on the grid of tube 29, the currents flowing through motor windings 50 and 51 produce equal and opposite effects and the motor discontinues operating.

It has been found quite practicable to so choose the electrical constants of the system that an angular displacement of the primary element 1 of one-tenth of a degree will cause the current in one motor field winding to rise to twice its normal value while that in the other field winding drops to zero. As a result, a powerful turning effort is produced by the motor. It will be understood that current is normally supplied to the motor armature at all times so that the motor is in condition to operate just as soon as the currents supplied to the field windings 50 and 51 are unbalanced. Inasmuch as ths unbalancing is within narrow limits proportional to the angular displacement of the coil 10 from its stable position, the system will have practically any desired number of running speeds and will automatically adjust itself to any varying speed of rotation of the arm 3 within its range.

I prefer to provide the resistance 36 and condenser 37 in the return lead of the high voltage secondary winding 49 in order to insure high electrical efficiency of the system. These elements function in a manner similar to that in which the ordinary C battery functions and serve to limit the plate current of all tubes to a normal value.

In order that the grid and plate voltages applied to the rectifier tubes may be substantially in phase with one another, I prefer to provide means for compensating for any phase displacement produced in any parts of the system. To accomplish this result I may provide one lead of the power transformer or of the solenoid 10 with an adjustable connection (such as that indicated at 26) with an impedance or resistance coil such as that shown at 27 connected across two of the three phases of the A. C. power supply. By moving this connection to various points the proper phase relation can be readily attained and once this is attained no further attention need be given to this matter of phase relation. The filament circuits of all tubes are preferably supplied with current from a suitable low voltage winding such as that indicated at 28 on the power transformer.

As pointed out above, my improved system can be made very sensitive to slight changes in the position of primary element 1 with respect to the secondary element. It is possible to have the motor develop a considerable amount of power even though the displacement between the primary and secondary elements is so slight as to produce only a very small change in the electrical condition of the grid circuit of the tube 29. By providing the rectifiers 30 and 31, I can supply a substantially direct current to the motor field winding for the purpose of operating the motor. All of the current supplied to the motor is utilized in developing power and accordingly the system operates at maximum efficiency. The system is entirely independent of any ordinary changes in line voltage or frequency. Furthermore, the improved system consists of a simple combination of devices, each of which can be easily manufactured in quantities at low cost. It is thus possible to produce a system which so far as its operation is concerned is satisfactory in a very high degree, and this at a relatively low cost. My improved system possesses not only these advantages, but also the distinct advantage of preventing any force whatever from acting upon the primary element as a result of its displacement with respect to the secondary or follow-up element.

It is to be understood that my invention is not limited to the particular embodiment illustrated and described in detail, but includes such modifications thereof as fall within the scope of the appended claims. For example, while my improved system is particularly suited to use in follow-up systems, yet it can be used in other systems.

I claim:

1. In a system of the type described, the combination of two three-element vacuum tubes, a motor having an armature winding, a motor field winding comprising two magnetizing coils connected to the plates of the said vacuum tubes, an alternating current source of plate current for the said vacuum tubes, the said magnetizing coils being constructed and arranged so that the normal plate currents produce equal and opposite magnetizing effects, means for impressing unequal alternating current voltages on the grids of the said tubes, and means for adjusting at will the phase of the said alternating current source with respect to the grid voltages independently of said coils.

2. A system of the type described comprising the combination of a primary element, a secondary element, the said primary element being subject to displacement with respect to said secondary element, a coil carried by said primary element, means for supplying alternating current to said coil, a pair of opposed coils carried by said secondary element and arranged in inductive relation to said first coil, a three-element vacuum tube, the said second coil being connected to the grid of said vacuum tube, and motive means controlled by the output of said vacuum tube for driving one of said elements to maintain said coils in non-inductive relation with respect to each other.

3. A system of the type described comprising the combination of a primary element, a secondary element, the said primary element being subject to displacement with respect to said secondary element, a coil carried by said primary element, means for supplying alternating current to said coil, a three-element vacuum tube, and a pair of coils carried by said secondary element, and arranged in inductive relation to the first mentioned coil, the said pair of coils being connected in series and arranged so that the induced E. M. F. of one coil opposes that of the other coil, the said pair of coils being connected to the grid of said vacuum tube, and motive means controlled by the output of said vacuum tube for replacing the primary coil and the secondary pair of coils in non-inductive relation.

4. A system of the type described comprising the combination of a primary element, a secondary element, the said primary element being subject to displacement with respect to said secondary element, a coil carried by said primary element, means for supplying alternating current to said coil, a three-element vacuum tube, a pair of coils carried by said secondary element, and arranged in inductive relation to the first mentioned coil, the said pair of coils being connected in series and arranged so that the induced E. M. F. of one coil opposes that of the other coil, and the said pair of coils being connected to the grid of said vacuum tube, and means controlled by the output of said vacuum tube for replacing the primary coil and the secondary pair of coils in non-inductive relation for preventing current flow in said pair of coils.

5. A system of the type described comprising the combination of a primary element, a secondary element, the said primary element being subject to displacement with respect to said secondary element, a coil carried by said primary element, means for supplying alternating current to said coil, a three-element vacuum tube, a pair of coils carried by said secondary element and arranged in inductive relation to the first mentioned coil, the said pair of coils being connected in series and arranged so that the induced E. M. F. of one coil opposes that of the other, and the said pair of coils being connected to the grid of the said vacuum tube, a direct current source of plate current for said vacuum tube, a transformer connected to the plate of said vacuum tube, a pair of three-element vacuum tubes, means for connecting the transformer to the grids of said pair of tubes so that when one grid is more positive the other is more negative, a motor having a primary winding, a source of constant current for said primary winding, a motor field winding comprising two coils connected to the plates of said pair of vacuum tubes, and a source of plate current for said pair of vacuum tubes.

6. A system of the type described comprising the combination of a primary element, a secondary element, the said primary element being subject to displacement with respect to said secondary element, a coil carried by said primary element, means for supplying alternating current to said coil, a three-element vacuum tube, a pair of coils carried by said secondary element and arranged in inductive relation to the first mentioned coil, the said pair of coils being connected in series and arranged so that the induced E. M. F. of one coil opposes that of the other, and the said pair of coils being connected to the grid of said vacuum tube, a direct current source of plate current for said vacuum tube, a transformer connected to the plate of said vacuum tube, a pair of three-element vacuum tubes, means for connecting the transformer to the grids of said pair of tubes so that when one grid is more positive the other is more negative, a receiving device having two coils connected to the plates of said pair of vacuum tubes, a source of alternating current for supplying plate current to said pair of vacuum tubes, and means for adjusting the phase of this source of alternating current with respect to that of the voltages impressed on the grids of said pair of vacuum tubes.

7. A system of the type described comprising the combination of a primary element, a secondary element, the said primary element being subject to displacement with respect to said secondary element, a coil carried by said primary element, means for supplying alternating current to said coil, a three-element vacuum tube, a pair of coils carried by said secondary element and arranged in inductive relation to the first mentioned coil, the said pair of coils being connected in series and arranged so that the induced E. M. F. of one coil opposes that of the other, and the said pair of coils being connected to the grid of the said vacuum tube, a direct current source of plate current for said vacuum tube, a transformer connected to the plate of said vacuum tube, a pair of three-element vacuum tubes, means for connecting the transformer to the grids of said pair of tubes so that when one grid is more positive the other is more negative, a receiving device having two coils connected to the plates of said pair of vacuum tubes, a source of alternating current for supplying plate current for said pair of vacuum tubes, means for adjusting the phase of this source of alternating current with respect to that of the voltages impressed on the grids of the said pair of vacuum tubes, and means for preventing current flow in the pair of coils carried by said secondary element and for limiting the plate current of said pair of vacuum tubes.

8. In a system of the type described, the combination of a primary element, a secondary element, the said elements being subject to relative displacement, a coil carried by said primary element, a pair of coils connected in series opposition and carried by said secondary element in inductive relation to said first mentioned coil, means for supplying alternating current to said first mentioned coil, a three-element vacuum tube amplifier connected to said pair of coils, a pair of three-element rectifier tubes connected to the output side of said amplifier, a motor having a pair of field coils connected to the output side of said rectifier tubes and arranged so that when no voltage is induced in said pair of coils and impressed on the grids of said pair of tubes, the magnetizing effects of said field coils are equal and opposite, and means connecting said motor to said secondary element.

9. In a system of the type described, the combination of a primary element, a coil carried thereby, means for supplying alternating current to said coil, a follow-up element, a pair of coils connected in series opposition and mounted on said follow-up element in inductive relation to said first mentioned coil, a motor for driving said follow-up element, and means responsive to the difference between the voltages induced in said pair of coils for controlling said motor.

10. In a system of the type described, the combination of a primary element, a coil carried thereby, means for supplying alternating current to said coil, a follow-up element, a pair of coils connected in series opposition and mounted on said follow-up element in inductive relation to said first mentioned coil, a motor for driving said follow-up element, means responsive to the difference between the voltages induced in said pair of coils for controlling said motor, and means for preventing current flow in said pair of coils.

11. In a system of the type described, the combination of a secondary element including a pair of series connected coils, said coils being arranged so that the electromotive forces induced in one of them opposes that induced in the other, a primary element including a coil movable in inductive relation to said pair of coils, a source of current connected to said primary coil, a field winding controlled by said pair of coils, a motor controlled by the field winding, and driving connections between the motor and the secondary element, the opposed electromotive forces induced in said pair of coils by relative movement between them and the primary coil being balanced by a resultant movement of said motor to return said secondary coils into neutral inductive relation with said primary coil.

In testimony whereof, I affix my signature.

ARTHUR PATERSON DAVIS.